United States Patent [19]

Watanabe et al.

[11] Patent Number: 4,640,968

[45] Date of Patent: Feb. 3, 1987

[54] ETHYLIDENE NORBORNYL GROUP-CONTAINING POLYSILOXANE

[75] Inventors: Junichiro Watanabe; Yuichi Funahashi, both of Ohta; Kazuo Sugiura; Hironori Matsumoto, both of Tokyo, all of Japan

[73] Assignee: Toshiba Silicone Co., Ltd., Japan

[21] Appl. No.: 787,232

[22] Filed: Oct. 15, 1985

[30] Foreign Application Priority Data

Oct. 22, 1984 [JP] Japan ................................. 59-221539

[51] Int. Cl.$^4$ ............................................. C08G 77/20
[52] U.S. Cl. ......................................... 528/32; 528/14; 528/15; 528/25; 528/31; 528/37; 556/478; 556/479
[58] Field of Search ....................... 528/32, 15, 31, 25, 528/14, 37; 556/479, 478

[56] References Cited

U.S. PATENT DOCUMENTS 4,100,172  7/1978  Mui et al. .............................. 556/479

Primary Examiner—Melvyn I. Marquis

[57] ABSTRACT

A polysiloxane containing an ethylidene norbornyl group possesses a terminal group represented by the formula:

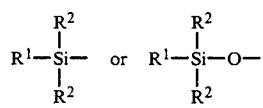

wherein $R^1$ stands for a monovalent hydrocarbon group, a hydroxyl group, an alkoxy group, or at least one of the hydrocarbon groups represented by Y, and each $R^2$ stands for the same or different groups selected from the class consisting of hydrogen, monovalent hydrocarbon groups, and a group represented by $R^1$ wherein $R^1$ has the same meaning as defined above, and being substantially in the form of a straight chain, 0 to 100 mol %, providing that 100 mol % is excluded where neither of the $R^1$'s in the terminal groups is a hydrocarbon group represented by Y of the component units being represented by the formula:

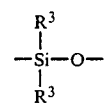

wherein each $R^3$'s stand for the same or different groups selected from the class consisting of hydrogen and monovalent hydrocarbon groups and 100 to 0 mol %, providing that 0 mol % is excluded where neither of the $R^1$'s in the terminal groups is a hydrocarbon group represented by Y of the component units being represented by the formula:

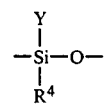

wherein $R^4$ stands for a monovalent hydrocarbon group of 1 to 8 carbon atoms and Y stands for

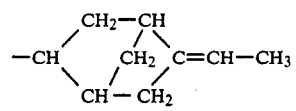

or

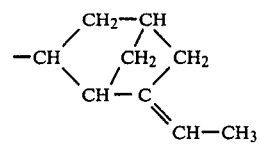

so as to bond a silicon atom to the neighboring silicon atom through an oxygen atom.

6 Claims, 1 Drawing Figure

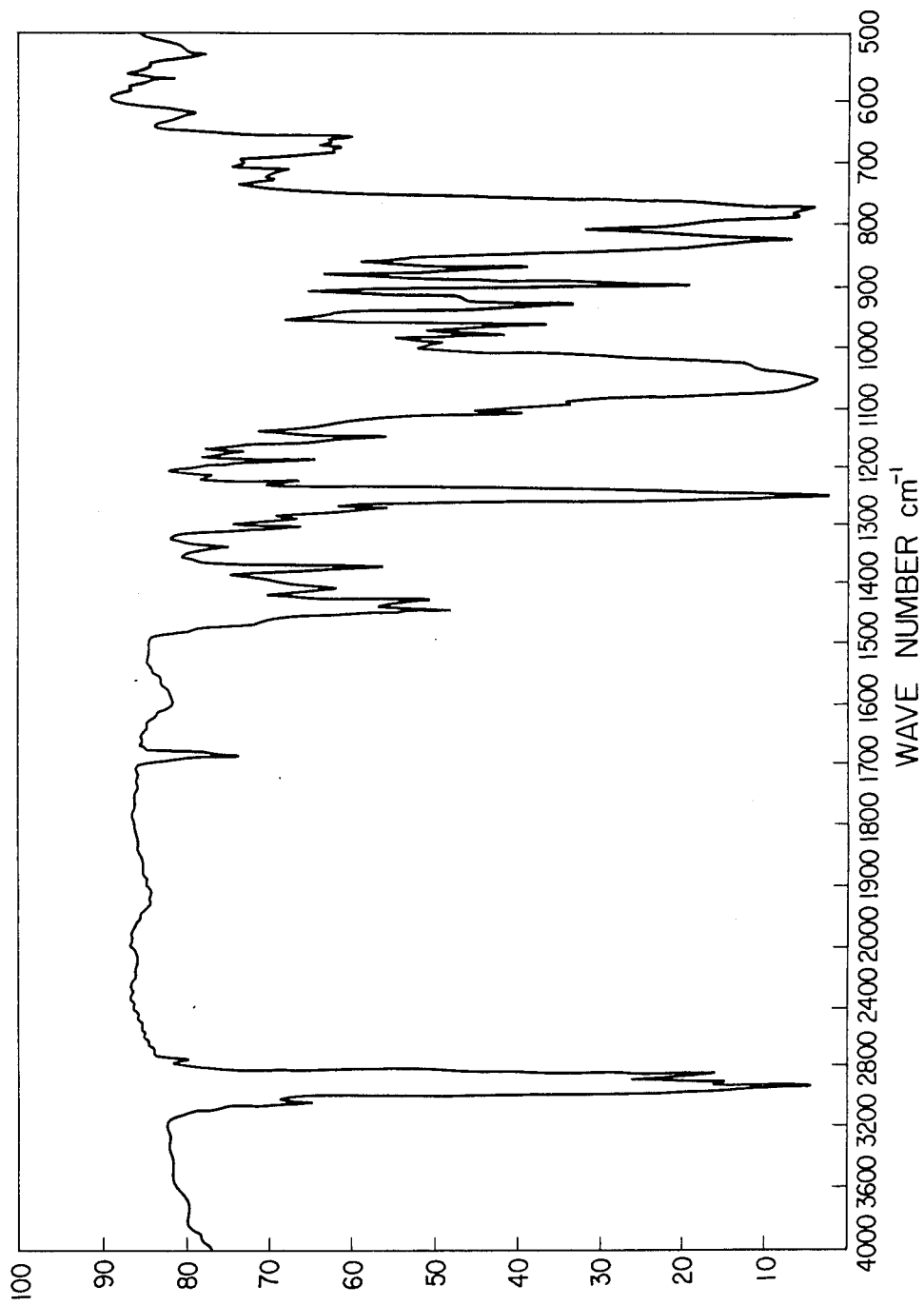

ETHYLIDENE NORBORNYL GROUP-CONTAINING POLYSILOXANE

The present application claims priority of Japanese patent application Ser. No. 84/221539 filed Oct. 22, 1984.

BACKGROUND OF THE INVENTION

This invention relates to a novel and useful linear polysiloxane containing an ethylidene norbornyl group.

Generally, addition curable silicone elastomer compositions depend for their cross-linking on vinyl groups. Thus, siloxanes containing vinyl groups are widely known, however, none of the known siloxanes contains a condensed ring unsaturated group.

SUMMARY OF THE INVENTION

It is an object of this invention, to provide siloxanes containing a condensed ring unsaturated group.

The present inventors conducted a diligent study in search of siloxanes containing a condensed ring unsaturated group. They have subsequently perfected this invention.

Specifically, this invention relates to ethylidene norbornyl group-containing polysiloxanes having a molecular weight in the range of 268 to 10,000,000 and possessing a terminal group represented by the formula:

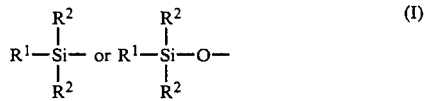   (I)

wherein $R^1$ stands for substituted or unsubstituted monovalent hydrocarbon group of 1 to 8 carbon atoms, a hydroxyl group, an alkoxy group of 1 to 5 carbon atoms, or at least one of the hydrocarbon groups represented by Y which is defined herinafter, and each $R^2$ stands for the same or different groups selected from the class consisting of hydrogen, substituted or unsubstituted monovalent hydrocarbon groups of 1 to 8 carbon atoms, and a terminal group represented by $R^1$ ($R^1$ having the same meaning as defined above), and being substantially in the form of a linear chain, 0 to 100 mol%, providing that 100 mol% is excluded where neither of the $R^1$'s in the terminal groups is a hydrocarbon group represented by Y which is defined hereinafter, of the component units being represented by the formula:

   (II)

wherein each $R^3$ stands for the same or different groups selected from the class consisting of hydrogen and substituted or unsubstituted monovalent hydrocarbon groups, and 100 to 0 mol%, providing that 0 mol% is excluded where neither of the $R^1$'s in the terminal groups is a hydrocarbon group represented by Y which is defined hereinafter, of the component units being represented by the formula:

   (III)

wherein $R^4$ stands for a substituted or unsubstituted monovalent hydrocarbon group of 1 to 8 carbon atoms and Y stands for

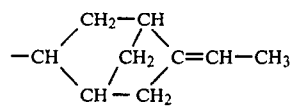

or

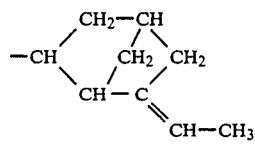

BRIEF DESCRIPTION OF THE DRAWING

FIG. is an infrared absorption spectrum of the mixture obtained in Example 1.

DESCRIPTION OF THE INVENTION

In the aforementioned polysiloxane, specific examples of the substituted or unsubstituted monovalent hydrocarbon group of 1 to 8 carbon atoms, as one of the substituents represented by $R^1$, include alkyl groups such as methyl, ethyl, propyl, and butyl groups, alkenyl groups such as vinyl and allyl groups, aryl groups such as phenyl and tolyl groups, aralkyl groups such as a benzyl group, and the aforementioned monovalent hydrocarbon groups where in hydrogen atoms attached to carbon atoms thereof are partially substituted by 3,3,3-trifluoropropyl group, cyano group, or halogen atom.

Examples of the alkoxy group of 1 to 5 carbon atoms, as another of the specific substituents represented by $R^1$, include methoxy, ethoxy, propoxy, and butoxy groups.

Specific examples of the substituents $R^2$ and $R^3$ are hydrocarbon and the same substituted or unsubstituted monovalent hydrogen groups of 1 to 8 carbon atoms as cited above with respect to $R^1$. Specific examples of the substituent $R^4$ are the same substituted or unsubstituted monovalent hydrocarbon groups of 1 to 8 carbon atoms as cited above with respect to $R^1$.

The groups represented by $R^1$ through $R^4$ and Y may be fixed invariably in the whole of a given molecule or may be varied between the terminal groups or among the component units of the molecule.

The component units represented by the formula (II) and those by the formula (III) may be regularly arranged or may be irregularly arranged.

In the groups which are linked to the silicon atoms in the whole of a given molecule, those of Y account for 0.05 to 50%, preferably 0.1 to 35% by mol. The molecular weight of the polysiloxane is in the range of 268 to 10,000,000. preferably 1,000 to 1,000,000.

Typical examples of the ethylidene norbornyl group-containing polysiloxane of the present invention will be cited below. It is provided, however, that the symbol Y has the same meaning as defined above. For the sake of simplicity, the following abbreviations will be used in the meanings indicated correspondingly. The component units are arranged substantially linear and may be irregular in order. This rule will apply similarly hereinafter in the specification.

Me: Methyl group Vi: Vinyl group Ph: phenyl group

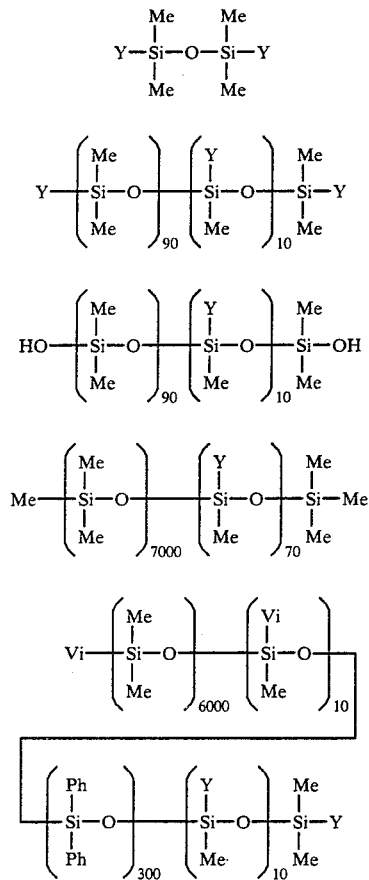

Procedures (1) through (4) available for the production of such ethylidene norbornyl group-containing polysiloxanes as cited above will be briefly described below.

Procedure (1) comprises keeping ethylidene norbornene in the presence of a catalyst such as chloroplatinic acid at 50° to 60° C. and adding 1,1,3,3-tetramethyldisiloxane dropwise thereto for reaction.

Procedure (2) comprises heating octamethylcyclotetrasiloxane, ethylidene norbornyl group-containing cyclotetrasiloxane, and the 1,1,3,3-tetramethyl-1,3-di(ethylidene norbornyl)disiloxane obtained in procedure (1) in the presence of a catalyst such as potassium hydroxide at a temperature of 130° to 160° C. for reaction.

Procedure (3) comprises heating octamethylcyclotetrasiloxane and ethylidene norbornyl group-containing cyclotetrasiloxane in the presence of a catalyst such as potassium hydroxide at a temperature of 130° to 160° C. for reaction.

Procedure (4) comprises heating octamethylcyclotetrasiloxane and ethylidene norbornyl group-containing cyclotetrasiloxane in the presence of a chain stopper such as hexamethyldisiloxane and a catalyst such as potassium hydroxide at a temperature of 130° to 160° C. for reaction.

In the procedures described above, a platinum-olefin complex or a palladium compound may be used in place of the chloroplatinic acid and lithium hydroxide or sulfuric acid may be used in the place of potassium hydroxide.

A desire to produce the polysiloxane in a form containing a vinyl group or phenyl group is fulfilled by using a cyclic siloxane containing group in addition to the reactants specified for the product.

EXAMPLES

The present invention will now be described more specifically with reference to working examples. Wherever "parts" are mentioned in the examples, they are meant as "parts by weight." By the same token, "viscosity" is meant as "viscosity measured at 25° C."

EXAMPLE 1

In a flask provided with a dropping funnel, 145 parts of ethylidene norbornene and 0.02 part of chloroplatinic acid as a catalyst were added and heated to 60° C. Then, 67 parts of 1,1,3,3-tetramethyldisiloxane was slowly added thereto from the dropping funnel. The resultant mixture was heated for addition reaction at 60° C. for ten hours. The resultant addition product was subjected to vacuum (10 mmHg) stripping at 130° C. to expel unaltered reactants and then distilled. Consequently, 170 parts (80% yield) of a mixture of the compounds in which Y are (a) and (b), represented by the following formulas, were obtained:

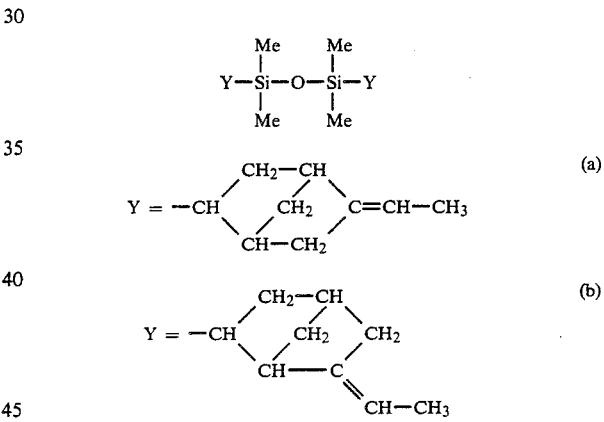

Boiling point: 170° C./4 mmHg
Refractive index ($n_D^{25}$): 1.494
Specific gravity (at 25° C.) : 0.954
Molecular weight: 374 (by gas-mass spectrum analysis)

| Elementary analysis: | | |
|---|---|---|
| | Found | Calculated (as $C_{22}H_{38}OSi_2$) |
| C | 71.0 | 70.6 |
| H | 10.3 | 10.1 |
| C | 4.2 | 4.3 |
| Si | 14.5 | 15.0 |

Infrared absorption spectrum: Figure

EXAMPLE 2

In a flask provided with a dropping funnel, 296 parts of octamethylcyclotetrasiloxane, 268 parts of heptamethyl ethylidene norbornyl cyclotetrasiloxane, and 25 parts of 1,1,3,3-tetramethyl-1,3-di(ethylidene norbornyl)disiloxane obtained in Example 1 were heated for reaction up to 150° C. The resultant liquid mixture and 0.01 part of potassium hydroxide added thereto as a catalyst were stirred at 150° C. for 15 hours for polymerization. The resultant polymerization mixture was neutralized by addition of 0.006 part of phosphoric acid and stripped off the unreacted oligomers. Consequently, there was obtained 270 parts (92% of yield) of silicone fluid of the following formula having a viscosity of 1,300 cSt.

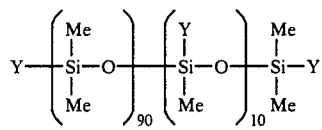

The product from the foregoing reaction, on infrared absorption spectrum analysis, was found a peak of 1,680 cm$^{-1}$ due to the double bond of ethylidene group.

EXAMPLE 3

In a flask provided with a dropping funnel, 592 parts of octamethylcyclotetrasiloxane, 20.7 parts of hexamethyl diethylidene norbornyl)cyclotetrasiloxane, and 0.38 part of decamethyltetrasiloxane were heated for reaction up to 150° C. The resultant reaction mixture and 0.01 part of potassium hydroxide added thereto as a catalyst were stirred at 150° C. for 15 hours for polymerization. The resultant polymerization mixture was neutralized by addition of 0.006 part of phosphoric acid and stripped off the unreacted oligomers. Consequently, there was obtained 560 parts of silicone gum containing 1 mol% of methyl ethylidene norbornyl siloxy units of the following formula having a relative viscosity of 1.9 (as 1% toluene solution) and a molecular weight of 530,000.

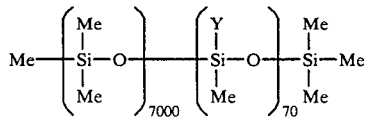

EXAMPLE 4

In a flask provided with a dropping funnel, 592 parts of octamethylcyclotetrasiloxane, 33.2 parts of heptamethyl ethylidene norbornyl cyclotetrasiloxane, 1.4 parts of tetramethyltetravinylcyclotetrasiloxane, 81.6 parts of octaphenylcyclotetrasiloxane, and 0.45 part of decamethyltetrasiloxane were heated for reaction up to 150° C. The resultant reaction mixture and 0.02 part of potassium hydroxide added thereto as a catalyst were stirred at 150° C. for 20 hours for polymerization. The polymerization mixture was neutralized with 0.012 part of phosphoric acid and stripped off the unreacted oligomers. Consequently, there was obtained silicone gum of the following formula, having a relative viscosity of 2.1 (as 1% toluene solution).

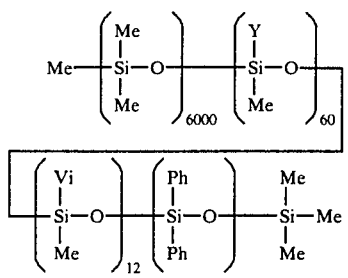

EXAMPLE 5

In a flask provided with a dropping funnel, 296 parts of octamethylcyclotetrasiloxane, 268 parts of heptamethyl ethylidene norbornyl cyclotetrasiloxane, 1,030 parts of trimethyl-tri-3,3,3-trifluoropropylcyclotrisiloxane, and 0.83 part of drecamethyltetrasiloxane were heated for reaction up to 150° C. The resultant reaction mixture and 0.01 part of potassium hydroxide added thereto as a catalyst were stirred at 150° C. for 50 hours for polymerization. Subsequently, the resultant polymerization mixture was neutralized with 0.006 part of phosphoric acid and stripped off the unreacted oligomers. Consequently, there was obtained silicone elastomer of the following formula.

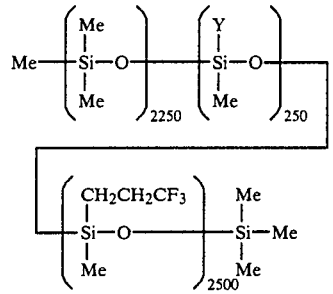

The compound of the present invention, owing to the double bond possessed thereby, can be utilized as a cross-linking polydiorganosiloxane serving as a main raw material for silicone elastomer and can be utilized extensively for the production of elastomers.

We claim:

1. An ethylidene norbornyl group-containing polysiloxane, having a molecular weight in the range of 268 to 10,000,000, and possessing a terminal group represented by the formula:

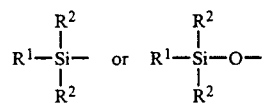

wherein $R^1$ stands for a substituted or unsubstituted monovalent hydrocarbon group of 1 to 8 carbon atoms, a hydroxyl group, an alkoxy group of 1 to 5 carbon atoms, or at least one of the hydrocarbon groups represented by Y, and each $R^2$ stands for the same or different groups selected from the class consisting of hydrogen, substituted or unsubstituted monovalent hydrocarbon groups of 1 to 8 carbon atoms, and a terminal group represented by $R^1$ wherein $R^1$ has the same meaning as above, and being substantially in the form of a linear chain, 0 to 100 mol%, providing that 100 mol% is excluded where neither of the R¹'s in the terminal groups is a hydrocarbon group represented by Y, of the component units being represented by the formula:

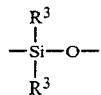

wherein each R³ stands for the same or different groups selected from the class consisting of hydrogen and substituted or unsubstituted monovalent hydrocarbon groups and 100 to 0 mol%, providing that 0 mol% is excluded where neither of the R¹'s in the terminal groups is a hydrocarbon group represented by Y, of the component units being represented by the formula:

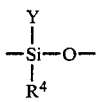

wherein R⁴ stands for a substituted or unsubstituted monovalent hydrocarbon group of 1 to 8 carbon atoms and Y stands for

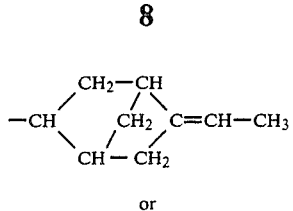

2. An ethylidene norbornyl group-containing polysiloxane according to claim 1, wherein Y accounts for 0.05 to 50% by mol of the groups bonded to silicon atoms.

3. An ethylidene norbornyl group-containing polysiloxane according to claim 1, wherein the molecular weight is in the range of from 1,000 to 1,000,000.

4. An ethylidene norbornyl group-containing polysiloxane according to claim 1 wherein at least one of the R¹'s is at least one of the hydrocarbon groups represented by Y.

5. An ethylidene norbornyl group-containing polysiloxane according to claim 1, wherein at least one of the R¹'s is a hydroxyl group.

6. An ethylidene norbornyl group-containing polysiloxane according to claim 1, wherein at least one of the R¹'s is a vinyl group.

* * * * *